(12) United States Patent
Etherington et al.

(10) Patent No.: US 9,279,709 B2
(45) Date of Patent: Mar. 8, 2016

(54) SENSOR DEVICE FOR DETECTING A FLOW PROPERTY OF A FLUID MEDIUM

(75) Inventors: Kurt Etherington, Brighton, MI (US);
Norbert Schneider, Tiefenbronn (DE);
Heinz Rilling, Eberdingen (DE); Uwe Konzelmann, Asperg (DE); Andreas Kaufmann, Sontheim an der Brenz (DE); Michael Rittmann, Ditzingen (DE); Andreas Stark, Lauscha (DE);
Hans Beyrich, Frieberg/N (DE)

(73) Assignee: ROBERT BOSCH GMBH, Stuttgart (DE)

( * ) Notice: Subject to any disclaimer, the term of this patent is extended or adjusted under 35 U.S.C. 154(b) by 119 days.

(21) Appl. No.: 13/882,298

(22) PCT Filed: Sep. 2, 2011

(86) PCT No.: PCT/EP2011/065206
§ 371 (c)(1),
(2), (4) Date: Jul. 8, 2013

(87) PCT Pub. No.: WO2012/055621
PCT Pub. Date: May 3, 2012

(65) Prior Publication Data
US 2013/0283895 A1  Oct. 31, 2013

(30) Foreign Application Priority Data
Oct. 28, 2010 (DE) .......................... 10 2010 043 062

(51) Int. Cl.
*G01M 3/02* (2006.01)
*G01F 1/692* (2006.01)
(Continued)

(52) U.S. Cl.
CPC .............. *G01F 1/692* (2013.01); *G01F 1/6842* (2013.01); *G01F 15/02* (2013.01)

(58) Field of Classification Search
CPC ....... G01F 1/6842; G01F 1/692; G01F 15/02; G01F 1/684; G01F 5/00; G01L 19/147; F02D 2200/0418; F02D 2400/18; F02D 2041/285
USPC ................... 73/53.01, 53.04, 114.32, 114.33, 73/114.34
See application file for complete search history.

(56) References Cited

U.S. PATENT DOCUMENTS 4,083,244 A * 4/1978 Agar et al. ................. 73/204.21
6,012,432 A * 1/2000 Igarashi et al. ............... 123/494

(Continued)

FOREIGN PATENT DOCUMENTS

EP   1 017 931   7/2000
EP   2 154 494   2/2010

OTHER PUBLICATIONS

Robert Bosch GmbH : "Sensoren im Kraftfahrzeug" [Sensors in Motor Vehicles], 2007 edition, pp. 140-142.

*Primary Examiner* — Laura Martin
*Assistant Examiner* — Samir M Shah
(74) *Attorney, Agent, or Firm* — Kenyon & Kenyon LLP

(57) ABSTRACT

A sensor device for detecting at least one flow property of a fluid medium, including at least one sensor housing, in which at least one electronic module having at least one flow sensor for detecting the flow property is accommodated. At least one pressure sensor and at least one humidity sensor are accommodated inside the sensor housing, at least the pressure sensor and optionally also the humidity sensor is situated inside the sensor housing independently of the electronic module.

16 Claims, 2 Drawing Sheets

(51) Int. Cl.
*G01F 1/684* (2006.01)
*G01F 15/02* (2006.01)

(56) References Cited

U.S. PATENT DOCUMENTS

| | | | |
|---|---|---|---|
| 6,181,574 B1* | 1/2001 | Loibl | 361/816 |
| 6,581,447 B1* | 6/2003 | Strohrmann et al. | 73/114.32 |
| 6,911,894 B2* | 6/2005 | Bonne et al. | 338/25 |
| 7,219,543 B2* | 5/2007 | Tanaka et al. | 73/204.22 |
| 7,243,541 B1* | 7/2007 | Bey et al. | 73/431 |
| 7,305,878 B2* | 12/2007 | Tanaka et al. | 73/204.26 |
| 7,370,526 B1* | 5/2008 | Ice | 73/204.22 |
| 7,640,798 B2* | 1/2010 | Oda | 73/204.26 |
| 7,832,269 B2* | 11/2010 | Bey et al. | 73/431 |
| 8,091,413 B2* | 1/2012 | Saito et al. | 73/114.33 |
| 8,104,340 B2* | 1/2012 | Speldrich | 73/202.5 |
| 8,175,835 B2* | 5/2012 | Dmytriw et al. | 702/100 |
| 8,397,586 B2* | 3/2013 | Sorenson et al. | 73/861.52 |
| 8,485,031 B2* | 7/2013 | Speldrich et al. | 73/204.22 |
| 8,549,901 B2* | 10/2013 | Saito et al. | 73/114.33 |
| 8,573,041 B2* | 11/2013 | Saito et al. | 73/114.32 |
| 8,701,475 B2* | 4/2014 | Kohno | 73/114.33 |
| 2005/0022594 A1* | 2/2005 | Padmanabhan et al. | 73/204.26 |
| 2005/0193812 A1* | 9/2005 | Ice | 73/170.02 |
| 2008/0163683 A1* | 7/2008 | Becke et al. | 73/431 |
| 2010/0031737 A1* | 2/2010 | Saito et al. | 73/114.33 |
| 2010/0180675 A1* | 7/2010 | Schneider et al. | 73/114.31 |
| 2011/0259097 A1* | 10/2011 | Mais et al. | 73/204.25 |
| 2013/0174654 A1* | 7/2013 | Schneider et al. | 73/114.01 |
| 2013/0269419 A1* | 10/2013 | Etherington et al. | 73/37 |

* cited by examiner

PRIOR ART

SENSOR DEVICE FOR DETECTING A FLOW PROPERTY OF A FLUID MEDIUM

FIELD OF THE INVENTION

The present invention relates to a sensor device for detecting at least one flow property of a fluid medium.

BACKGROUND INFORMATION

Numerous methods and devices for determining flow properties of fluid media, i.e., liquids and/or gases, are understood from the related art. The flow properties may in principle be arbitrary physically and/or chemically measurable properties, which qualify or quantify a flow of the fluid medium. In particular, this may relate to a flow velocity and/or a mass flow rate and/or a volume flow rate.

So-called hot-film air mass meters are discussed, for example, in Robert Bosch GmbH: Sensoren im Kraftfahrzeug (Sensors in Motor Vehicles), 2007 edition, pages 140-142. Such hot-film air mass meters are generally based on a sensor chip, in particular a silicon sensor chip, having a measuring surface over which the flowing fluid medium may flow. The sensor chip typically includes at least one heating element and at least two temperature sensors, which are situated on the measuring surface of the sensor chip, for example. A mass flow rate and/or volume flow rate of the fluid medium may be inferred from an asymmetry of the temperature profile detected by the temperature sensors, which is influenced by the flow of the fluid medium. Hot-film air mass meters are may be plug-in sensors, which are introducible permanently or replaceably into a flow tube. For example, this flow tube may be an intake manifold of an internal combustion engine.

To be able to precisely infer specific flow properties of the fluid medium from the sensor signals of the hot-film air mass meter, it is desirable in many cases to be able to provide further information about the fluid medium. Thus, for example, a sensor for an internal combustion engine is proposed in EP 1 017 931 B1, which has an air mass flow meter having a sensor element for detecting the air mass flow taken in. Adjacent to the air mass flow meter and its sensor element, a humidity sensor and a pressure sensor and an analysis circuit for processing the data output by the air mass meter or its sensor element, the humidity sensor, and the pressure sensor are provided and situated in a single housing.

In spite of the technical improvements which are achievable by the device described in EP 1 017 931 B1, in particular the improved signal accuracy and the possibility of determining further properties of the flowing fluid medium, such combined sensors are subject to various technical challenges. These challenges are of a configuration and production nature in particular. Thus, hot-film air mass meters have already been commercially available for many years and are in use in numerous motor vehicles. The integration of pressure and humidity sensors into hot-film air mass meters/plug-in sensors, as proposed in EP 1 017 931 B1, requires an adaptation of the geometry and the configuration of the plug-in sensor in many cases. Plug-in sensors already in use are therefore not replaceable or are only replaceable with difficulty by new plug-in sensors having pressure and humidity sensors, since in principle the entire module must be replaced. Furthermore, production facilities must be completely converted and reorganized in many cases, as soon as plug-in sensors having additional pressure and humidity measuring capabilities are to be produced.

In particular the combined electronic module with a pressure and humidity sensor, as proposed in EP 1 017 931 B1, requires a substantial adaptation of the production and assembly procedure. In this way, keeping available externally compatible plug-in sensors of different functionalities, i.e., plug-in sensors having pressure and humidity measuring capabilities and plug-in sensors without such pressure and humidity measuring capabilities, is virtually not implementable because of cost concerns. Therefore, a sensor device for detecting a flow property of a fluid medium, which is configured to also generate pressure and temperature signals, and which is producible in a simple and cost-effective way, with the least possible modification of known production methods for plug-in sensors without such pressure and humidity measuring capabilities, would be desirable.

SUMMARY OF THE INVENTION

Accordingly, a sensor device for detecting at least one flow property of a flowing fluid medium is proposed, which largely meets these requirements and which at least largely avoids the disadvantages of known sensor devices of this type. For example, the above description of the related art may be referred to with respect to the at least one flow property to be detected, which may be detected qualitatively and/or quantitatively. In particular, this flow property may be a flow velocity and/or a mass flow rate and/or a volume flow rate of the fluid medium. The fluid medium may be a gas in particular, which may be air. The sensor device is usable in particular in automotive technology, for example, in the intake manifold of an internal combustion engine. However, other fields of use are also possible in principle.

The sensor device includes at least one sensor housing. A sensor housing is to be understood within the scope of the present invention as a one-part or also a multipart device, which at least largely closes the sensor device to the outside and at least largely protects it in relation to mechanical effects and also other types of effects, for example, chemical effects and/or humidity effects. In particular, the sensor housing may include at least one plug-in sensor or may be configured as a plug-in sensor, the plug-in sensor being introducible into the flowing fluid medium, a replaceable introduction or also a permanent introduction being conceivable. For example, the plug-in sensor may protrude into a flow tube of the flowing fluid medium, the flow tube itself being able to be part of the sensor device or may also be provided as a separate part, for example, having an opening into which the plug-in sensor is introducible. The plug-in sensor and the flow housing may be produced in particular at least partially from a plastic material, for example, using an injection-molding method.

At least one electronic module having at least one flow sensor for detecting the flow property is accommodated inside the sensor housing. An accommodation in the sensor housing is to be understood to mean that the electronic module is to be at least partially, which may be completely, enclosed by the sensor housing. As described in greater detail below, the electronic module may, in particular, be situated in an electronic space of the sensor housing which may, for example, be configured as a cavity in the sensor housing and which may be closable by at least one electronic space cover or another closing element.

A flow sensor is to be understood in principle as an arbitrary sensor element, which is configured to detect the at least one flow property. The flow sensor may, in particular, be at least one hot-film air mass meter chip, e.g., of the type described above. In particular, this hot-film air mass meter chip may include at least one silicon chip, having a measuring surface over which the flowing fluid medium may flow. For example, at least one heating element and at least two temperature sensors may be situated on this sensor surface, as described above, the at least one flow property being inferrable from an asymmetry of the temperature profile measured with the aid of the temperature sensor. The at least one flow sensor may be situated, for example, on a sensor carrier of the electronic module, which protrudes into the flowing fluid medium. The electronic module may be configured in one piece in particular and may carry an activation and/or analysis circuit in particular, which is configured to activate the flow sensor and/or to record signals of the flow sensor. Accordingly, the electronic module may have at least one circuit carrier, for example. Furthermore, the electronic module may have in particular the at least one sensor carrier, which may be mechanically connected to the circuit carrier. For example, the circuit carrier may be situated in an electronic space of the sensor housing, and the sensor carrier may protrude out of this electronic space into the fluid medium.

It particularly may be the case if the sensor housing has at least one channel through which the fluid medium may flow, the sensor carrier of the electronic module, which carries the flow sensor, protrudes out of the electronic space into the at least one channel in the sensor housing, through which the fluid medium may flow. This at least one channel may be configured in one piece in particular, but may also have at least one main channel and at least one bypass channel branching off of this main channel, the sensor carrier may protrude into the bypass channel, as may be understood in principle from the related art. The circuit carrier of the electronic module may include a circuit board in particular, which is used alone or which is installed on a mechanical carrier, for example, a stamped-bent part, for example, made of a metallic material, for example. The sensor carrier may be directly connected to the circuit carrier or also to the carrier part, for example, the stamped-bent part, for example, in that the sensor carrier is extruded onto this stamped-bent part. Other embodiments are also possible. Thus, for example, it is conceivable to produce the electronic module from a circuit board material, both the circuit carrier and the sensor carrier being produced from the circuit board material, which may be from one piece of the circuit board material. It is in turn alternatively or additionally also possible to use injection-molded circuit boards known from the related art as the electronic module, for example, injection-molded circuit boards in one or more so-called MID technologies (MID: molded interconnect device). Various embodiments are conceivable.

The sensor device also has at least one pressure sensor and at least one humidity sensor. The pressure sensor and the humidity sensor are arranged inside the sensor housing. An arrangement inside the sensor housing is again to be understood as an arrangement in which both the pressure sensor and the humidity sensor are at least partially, which may be completely, enclosed by the sensor housing. For example, the pressure sensor and the humidity sensor may be accommodated together or individually inside at least one inner space, e.g., again the electronic space, of the sensor housing, it may be possible to open the inner space for an assembly and optionally to subsequently close it, e.g., again by an electronic space cover and/or another closing element.

A pressure sensor is to be understood in principle as an arbitrary sensor element which is configured to detect a pressure of the fluid medium. In particular, this may be a micromechanical pressure sensor in this case, as is described, for example, in Robert Bosch GmbH: Sensoren im Kraftfahrzeug (Sensors in Motor Vehicles), pages 128-130. However, other types of pressure sensors are alternatively or additionally usable, for example, pressure sensors which are based directly on the use of one or more strain gauges or similar pressure sensor elements.

A humidity sensor is to be understood in principle as an arbitrary sensor element which is configured to detect a humidity of the fluid medium. For example, resistive and/or capacitive sensor elements come into consideration in this case, as are known from the related art. Examples of such humidity sensors are described in Robert Bosch GmbH: Sensoren im Kraftfahrzeug (Sensors in Motor Vehicles), 2007 edition, pages 92-95. However, other types of humidity sensors also come into consideration, in principle alternatively or additionally, for use within the scope of the present invention.

To achieve the object described above, it is proposed according to the present invention that at least the pressure sensor and optionally also the humidity sensor are arranged inside the sensor housing independently of the electronic module. An arrangement of the pressure sensor and optionally also the humidity sensor independently of the electronic module is to be understood as an arrangement in which the pressure sensor and optionally also the humidity sensor are insertable into the sensor housing independently of the electronic module. For example, the electronic module and the pressure sensor and optionally also the humidity sensor may form independent assembly groups from one another, the pressure sensor and the humidity sensor being configured independently of one another, if necessary; however, they may also form one joint assembly group. In particular, the pressure sensor and optionally also the humidity sensor as well as the electronic module may be connected to the housing at different connecting points. For example, the sensor housing may be assembled in such a way that the pressure sensor and optionally also the humidity sensor are initially inserted into the sensor housing, e.g., an electronic space and/or another space of the sensor housing, the electronic module being subsequently inserted, or vice versa.

As described above, the sensor housing may, in particular, have at least one electronic space, the electronic module being at least partially accommodated in the electronic space. Here, one part of the electronic module may also protrude out of the electronic space, such as the sensor carrier which may protrude into a channel in the sensor housing, for example. If the sensor housing has at least one electronic space, the pressure sensor and optionally also the humidity sensor may be situated in this electronic space, independently of the electronic module, however.

The electronic module and the pressure sensor as well as optionally also the humidity sensor may, in particular, be accommodated on different assembly planes in the sensor housing and optionally in the electronic space. As described above, the pressure sensor and optionally also the humidity sensor may be situated on a first assembly plane in the electronic space, and the electronic module may be situated on a plane of the electronic space which is above or below the first plane. In this way, it is possible, for example, to successively assemble the electronic space with the pressure sensor as well as optionally with the humidity sensor and subsequently or previously with the electronic module.

The sensor housing may, in particular, have at least one pressure opening, in particular a pressure socket, the pressure sensor being accommodated inside the sensor housing in such a way that it may be acted on by a pressure of the fluid medium via the pressure opening. As described above, the pressure sensor may, for example, be situated in an electronic space of the sensor housing, in which the electronic module may be also accommodated. The electronic space may, for example, be assembled from a first side of the sensor housing, e.g., after removing an electronic space cover or prior to adding an electronic space cover. The pressure opening may, in particular, lead out of the electronic space and may, for example, be situated on a second side of the sensor housing which is opposite the first side.

The sensor housing may have at least one inlet opening for humidity, in particular at least one inlet port for humidity. The humidity sensor may be accommodated inside the sensor housing in such a way that it is acted on by humidity via the inlet opening. The inlet opening may, in particular, have a retaining element, in particular at least one diaphragm, the retaining element being at least partially permeable to humidity. For example, this retaining element may span completely or partially the at least one inlet opening and may be configured in such a way that it retains at least larger contaminants such as dust particles, dirt, fluid droplets, or similar larger contaminants, e.g., being larger than 0.2 mm, which may be larger than 0.5 mm, while humidity of the fluid medium, e.g., atmospheric humidity, may penetrate the retaining element. The retaining element may, in particular, include at least one humidity permeable diaphragm, e.g., a plastic diaphragm, and/or at least one mesh, e.g., at least one netting.

The humidity sensor may, in particular, be situated in an electronic space of the sensor housing; the humidity sensor may be assembled from a first side of the sensor housing, e.g., after removing and/or prior to adding an electronic space cover. Similarly to the pressure opening, the inlet opening may, in particular, be situated on a second side of the sensor housing which is opposite the first side. For example, the pressure opening and/or the inlet opening may be situated on a side of the housing which is opposite the electronic space cover. For example, the plug-in sensor may have a head side on its end which protrudes farthest into the fluid medium, a front side on its side pointing toward the flowing fluid medium, and a rear side on the side opposite the front side, the first side and the second side may form the side walls which may essentially be situated in parallel to the flow of the fluid medium and over which the flowing fluid medium may flow. The pressure opening and/or the inlet opening may be situated on one of these side walls.

The sensor device may additionally also include one or more further sensor elements, for detecting at least one further physical and/or chemical property of the fluid medium. In particular, the sensor device may also have at least one temperature sensor, in particular at least one temperature sensor situated on an outer side of the sensor housing. For example, a temperature sensor may be situated on an outer side of the sensor housing in such a way that it is also situated on the same side as the inlet opening for the humidity and/or the pressure opening. However, another embodiment is also possible in principle. In particular, the temperature sensor may be situated in at least one depression on one side wall of the plug-in sensor. The temperature sensor may in particular include at least one temperature-dependent resistor. Alternatively or additionally, other types of temperature sensors are also usable. In particular, the flowing fluid medium may be able to flow freely over the temperature sensor, i.e., the temperature sensor may not be enclosed by the housing of the sensor element. The temperature sensor may in particular be connected by a friction lock and/or form fit to the housing, for example, in that feed lines of the temperature sensor are caulked to an outer wall of the sensor housing or connected in another way. Feed lines of the temperature sensor may in particular be led into the interior of the sensor housing and connected therein to the electronic module, for example, and/or connected to a plug connector of the sensor device. Various other embodiments are conceivable.

The sensor device may furthermore be configured in such a way that at least one feed line of the humidity sensor and at least one feed line of the pressure sensor and optionally at least one feed line of the temperature sensor are electrically combined. These lines may be combined within the sensor housing and/or within a plug of the sensor device, for example. A measuring line and/or a supply line for the pressure sensor and the humidity sensor may be combined, for example.

In another aspect of the present invention, a method is proposed for manufacturing a sensor device for detecting at least one flow property of a fluid medium. This sensor device may, in particular, be a sensor device according to one or more of the above-described embodiment(s). Accordingly, reference for possible embodiments of the sensor device may be made to the description above or to the subsequent description of the exemplary embodiments. The sensor device includes at least one sensor housing. According to the method, at least one electronic module having at least one flow sensor for detecting the flow property is inserted into the sensor housing. Furthermore, at least one pressure sensor and at least one humidity sensor are inserted into the sensor housing according to the method. At least the pressure sensor and optionally also the humidity sensor are inserted here into the sensor housing independently of the electronic module. In particular, the insertion of the electronic module and the insertion of the pressure sensor as well as optionally also the insertion of the humidity sensor may take place in different assembly steps, e.g., in that the pressure sensor and optionally also the humidity sensor are initially inserted into the sensor housing, the electronic module is inserted subsequently, or vice versa.

The above-described sensor device and the above-described method have numerous advantages over known sensor devices and methods. In particular, the sensor device and the method are suitable to largely avoid the disadvantages of the known devices and methods. The sensor device may in particular be configured with respect to its external dimensions as essentially compatible with conventional sensor devices without a pressure sensor and without a humidity sensor. In particular, plug-in sensors may be produced, which, independently of whether or not they contain a pressure sensor and a humidity sensor, remain the same in their external dimensions. Furthermore, sensor devices of the mentioned type with and without pressure sensors or humidity sensors may be manufactured on the same manufacturing line as sensor devices which do not include such pressure and/or humidity sensors. In this way, the production, logistics, and warehousing of the described sensor devices are significantly simplified. In particular, an electronic space of the sensor housing may be configured in such a way that it may be used both without the pressure sensor or without the humidity sensor and also with these sensors. Alternatively, different sensor housings may be stocked which differ virtually only in the configuration of the electronic space, in that additional accommodations are, for example, provided for these sensors in sensor devices having a pressure sensor and a humidity sensor and in that no such accommodations are provided in other sensor housings. Overall, the design, manufacture, logistics, and warehousing may thus be significantly simplified and improved, and the sensor devices may be configured significantly more cost-effectively. In addition, the possibility exists of replacing already provided conventional sensor devices without pressure and humidity sensors by sensor devices according to the present invention.

Other optional details and features of the present invention result from the following description of exemplary embodiments, which are schematically shown in the figures.

DETAILED DESCRIPTION

Figure 1:
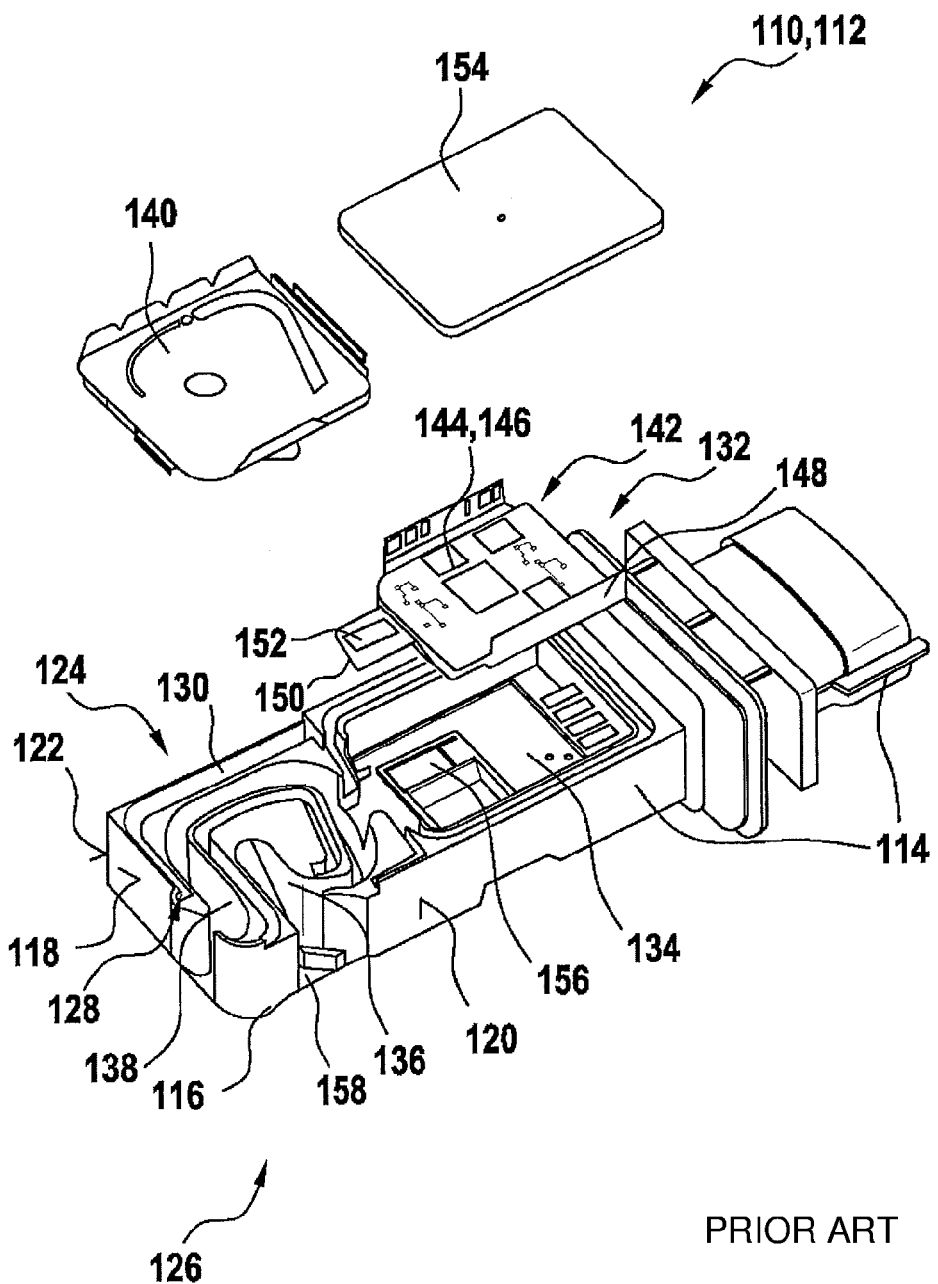
FIG. 1 shows a conventional sensor device for detecting at least one flow property of a fluid medium.

FIG. 1 shows an exemplary embodiment of a sensor device 110, corresponding to the related art, for detecting at least one flow property of a fluid medium in a perspective, open view. Sensor device 110 is configured in this exemplary embodiment as a hot-film air mass meter 112 and includes a plug-in sensor 114, which is introducible into a flow of the fluid medium, for example, an intake air mass flow, for example, reversibly pluggable or permanently installed in an intake manifold. Hot-film air mass meter 112 corresponds to a commercially available air mass flow sensor of the type HFM7 from Robert Bosch GmbH, Germany. Plug-in sensor 114 includes a sensor housing 116, having a head side 118, which protrudes farthest into the fluid medium, a front side 120 pointing toward the fluid medium, a rear side 122 facing away from the fluid medium, and two side faces in the form of a first side 124 and a second side 126, first side 124 being recognizable in the view according to FIG. 1.

A channel area 128 having at least one channel 130, through which the fluid medium may flow, and an electronic area 132 having an electronic space 134 incorporated in sensor housing 116 are accommodated inside sensor housing 116. Channel 130 in turn has a main channel 136 and a bypass channel 138. Channel area 128 is closable by a channel space cover 140 on first side 124. An electronic module 142 is accommodated in electronic space 134, which includes a circuit carrier 144 having an activation and/or analysis circuit 146, which may be accommodated on a base plate 148, for example. Furthermore, electronic module 142 includes a sensor carrier 150 in the form of a wing, which protrudes into bypass channel 138 and is extruded onto base plate 148. A flow sensor 152 in the form of a hot-film air mass meter chip is incorporated in sensor carrier 150. Electronic space 134 is closable on first side 124 by an electronic space cover 154. Furthermore, sensor housing 116 may include a cooling opening 156 on second side 126, which may extend into electronic space 134.

In the commercially available configuration of sensor device 110 according to FIG. 1, sensor carrier 150 and base plate 148 thus form a unit of electronic module 142. In addition to flow sensor 152, the electronics of circuit carrier 144 and activation and/or analysis circuit 146 are glued onto base plate 148. Flow sensor 152 and activation and/or analysis circuit 146 are generally connected to one another by bond connections. Electronic module 142 thus created is glued, for example, into electronic space 134, and entire plug-in sensor 114 is closed by covers 140, 154.

Figure 2A:
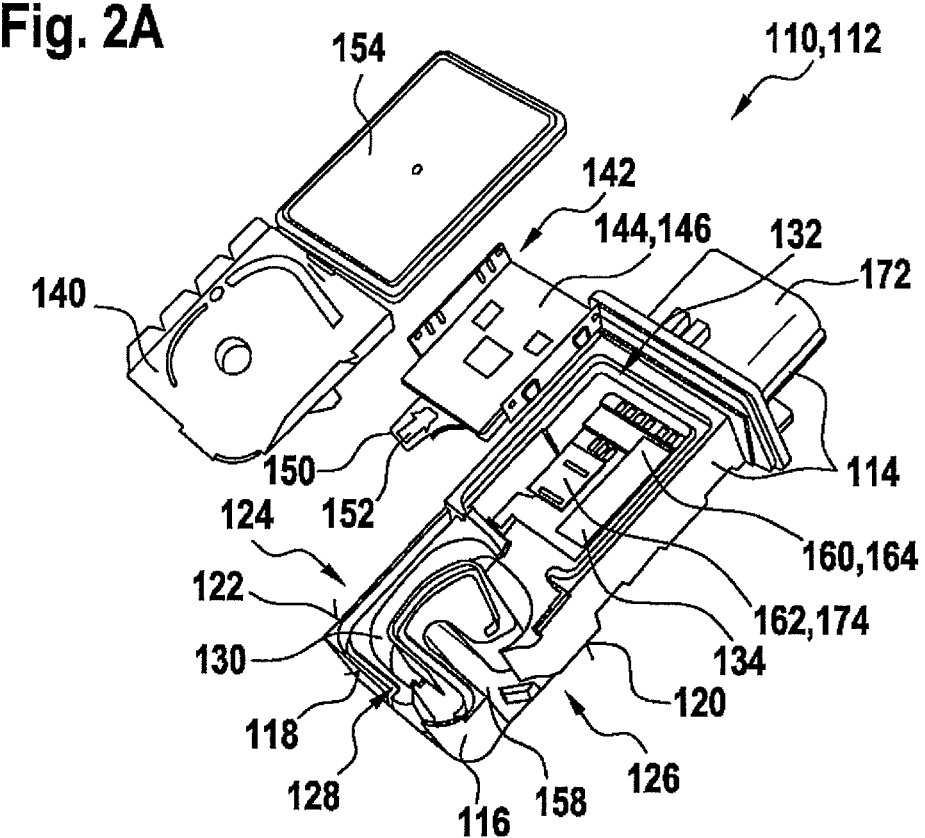
FIG. 2A shows a view of a specific embodiment according to the present invention of a sensor device.
Figure 2B:
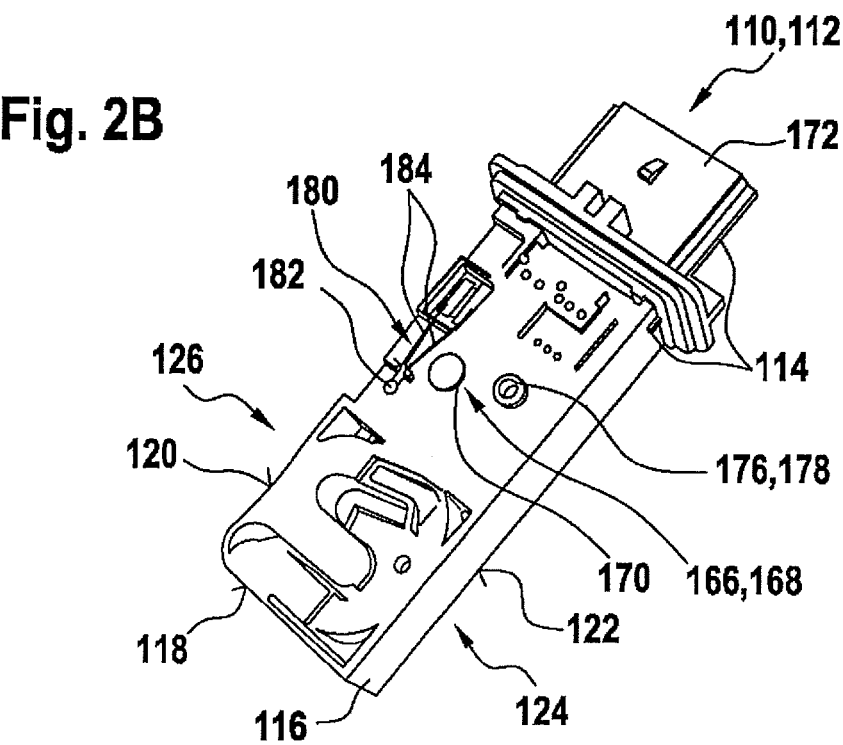
FIG. 2B shows another view of a specific embodiment according to the present invention of a sensor device.

In contrast, FIGS. 2A and 2B show an exemplary embodiment according to the present invention of a sensor device 110.

This is again an example of a hot-film air mass meter 112, which is initially configured similarly in principle to sensor device 110 according to FIG. 1. Accordingly, reference may be largely made to the description of FIG. 1. FIG. 2A shows an open perspective view of first side 124, whereas FIG. 2B shows a perspective view of second side 126.

Hot-film air mass meter 112 again includes a plug-in sensor 114 having a sensor housing 116. A channel area 128 is again provided in sensor housing 116, similarly to plug-in sensor 114 according to FIG. 1, having a channel 130, into which a fluid medium may flow via a channel inlet opening 158 provided on a front side 120 of plug-in sensor 114. Furthermore, an electronic space 134 in an electronic area 132 is again provided, in which an electronic module 142 having a flow sensor 152 is provided. In this regard, reference may be made at least largely to the above description. Channel area 128 is again closable by a channel space cover 140, and electronic space 134 is closable by an electronic space cover 154. Other embodiments are also possible in principle.

In sensor device 110 according to FIGS. 2A and 2B, a humidity sensor 160 and a pressure sensor 162 are additionally integrated into the provided installation space. Humidity sensor 160 and/or pressure sensor 162 may each be individual sensors or sensor modules. For example, humidity sensor 160 may be configured as a humidity module 164. Humidity sensor 160 and pressure sensor 162 may be configured separately from one another, but may also be configured in combination in principle.

According to the exemplary embodiment according to FIGS. 2A and 2B, the configuration of sensor device 110 takes place on two assembly planes in this exemplary embodiment. Here, humidity sensor 160 and pressure sensor 162 are situated in a first assembly plane in the bottom area of electronic space 134, below a second assembly plane in which electronic module 142 is situated. This two-layer configuration is enabled, in particular, by the elimination of cooling opening 156. The assembly of pressure sensor 162 and humidity sensor 160 in plug-in sensor 114 may take place on a separate manufacturing line. The plug-in sensor module pre-assembled in this way may then be further processed on existing serial production equipment, e.g., serial production equipment for the assembly of plug-in sensor 114 according to FIG. 1.

As described above, humidity sensor 160 may be integrated on a humidity module 164. This humidity module 164 may, for example, include a printed circuit board as a circuit carrier on which actual humidity sensor 160 and, if necessary, one or more electronic components, such as in particular evaluation circuits, may be situated.

Furthermore, sensor housing 116 of the exemplary embodiment according to FIG. 2A includes an inlet opening 166 for humidity, in particular in the form of a humidifying nozzle 168, on second side 126. This inlet opening 166 may be closed by at least one retaining element 170, in particular a semipermeable diaphragm. Humidity sensor 160 is connected to the surroundings via humidifying nozzle 168. Retaining element 170 is used for protection against permeating water or dirt, but is permeable for humidity. Humidity module 164 may, for example, be glued into sensor housing 116 of plug-in sensor 114 or connected in another way to sensor housing 116. Humidity module 164 may be connected to a plug 172 of plug-in sensor 114 by bond connections.

For example, a micromechanical pressure sensor may be used as pressure sensor 162, which may in turn also be integrated into a pressure sensor module 174, for example. The premold of the commercially available pressure sensor of the type DS-S3 from Robert Bosch GmbH, Germany may be used as pressure sensor 162, for example. Pressure sensor 162 may be installed in particular adjacent to humidity module 164 and may again be connected to sensor housing 116, for example, again by an adhesive bond, for example. Other embodiments are also possible in principle, however. Pressure sensor 162 may again be contacted and electrically connected to plug 172, for example with the aid of a welded connection. Other embodiments are also possible, however. Pressure sensor 162 may be acted on by pressure through a pressure opening 176, e.g., again in the form of a pressure socket 178 on second side 126. The assembly of electronic module 142 may take place according to the customary assembly techniques. For example, the assembly may take place on a second assembly plane, similarly to a contemporary series production of sensor device 110 according to FIG. 1, for example.

Furthermore, it is apparent in FIG. 2B that sensor device 110 may have additional sensor elements. According to one optional embodiment, sensor device 110 according to FIG. 2B has a temperature sensor 180 on second side 126. It may, for example, include a measuring head 182 as well as feed lines 184 which may, for example, be heat caulked to sensor housing 116. Feed lines 184 may also be conducted into the inside of sensor housing 116, as shown in FIG. 2B. Temperature sensor 180 may be completely exposed to the fluid medium.

By integrating the pressure and humidity measurements within existing plug-in sensors 114 and the existing installation space, plug-in sensor 114 according to the present invention according to FIGS. 2A and 2B may, in particular, be installable in plug-in sensors 114 which are already commercially available, for example according to FIG. 1. When using such sensor devices 110 according to the present invention, the user is usually not required to make changes in the intake manifold. Furthermore, the user's costs for the cable harness are reduced due to the elimination of mating plugs and a reduction of cables due to the possibility of a combination of lines. In the exemplary embodiment shown or also in other exemplary embodiments of sensor devices 110 according to the present invention, one or more lines of humidity sensor 160 and pressure sensor 162, e.g., the ground and supply lines for pressure sensor 162 and humidity module 164, may, for example, be electrically combined. Due to the configuration in multiple assembly planes, the assembly of pressure sensor 162 and humidity sensor 160 may take place on a separate manufacturing line. The further assembly may take place on existing serial production equipment.

The invention claimed is:

1. A sensor device for detecting a flow property of a fluid medium, comprising:
   a sensor housing that includes, situated adjacent to each other, an electronics accommodation compartment and a flow compartment in which the fluid medium is able to flow;
   an electronic module that includes a flow sensor for detecting the flow property, the flow sensor being accommodated inside the sensor housing and extending within a first plane from inside the electronics accommodation compartment into the flow compartment; and
   a pressure sensor accommodated within the sensor housing and situated in the electronics accommodation compartment entirely below the first plane.

2. The sensor device of claim 1, further comprising a humidity sensor situated in the electronics accommodation compartment.

3. The sensor device of claim 2, wherein the pressure sensor and the humidity sensor are entirely situated in at least one second plane that is parallel to and below the first plane.

4. The sensor device of claim 1, wherein the electronic module includes a sensor carrier carrying the flow sensor and protruding out of the electronics accommodation compartment into at least one channel of the flow compartment.

5. The sensor device of claim 1, wherein the sensor housing has at least one pressure opening, including at least one pressure socket, so that a pressure of the fluid medium can act on the pressure sensor accommodated inside the sensor housing via the at least one pressure opening.

6. The sensor device of claim 5, wherein the sensor housing is configured for installation of the pressure sensor and the electronic module in the sensor housing via a first side of the sensor housing, the pressure opening being situated on a second side of the sensor housing that is opposite the first side.

7. The sensor device of claim 1, further comprising a humidity sensor situated in the sensor housing, wherein the sensor housing has at least one inlet opening via which humidity is able to act on the humidity sensor.

8. The sensor device of claim 1, wherein the humidity sensor is situated in the electronics accommodation compartment, the sensor housing is configured for installation of the humidity sensor via a first side of the sensor housing, the inlet opening being situated on a second side of the sensor housing that is opposite the first side.

9. The sensor device of claim 1, further comprising at least one temperature sensor situated on an outer side of the sensor housing.

10. The sensor device of claim 1, wherein the flow sensor is a hot-film air mass meter chip.

11. The sensor device of claim 1, wherein the electronic module further includes an activation circuit (a) configured to activate the flow sensor, and (b) situated at least partially in the first plane.

12. The sensor device of claim 11, wherein the electronic module further includes an analysis circuit (a) configured to record signals of the flow sensor, and (b) situated at least partially in the first plane.

13. The sensor device of claim 1, wherein the electronic module further includes an analysis circuit (a) configured to record signals of the flow sensor, and (b) situated at least partially in the first plane.

14. A method for manufacturing a sensor device for detecting a flow property of a fluid medium, the sensor device including a sensor housing, the sensor housing including an electronics accommodation compartment, the method comprising:
    inserting a pressure sensor into the electronics accommodation compartment; and
    in a separate insertion step, which is subsequent to the insertion of the pressure sensor, inserting an electronic module that includes a flow sensor above the pressure sensor.

15. The method of claim 14, further comprising inserting a humidity sensor into the electronics accommodation compartment before the insertion the electronic module, the electronic module, when inserted, being positioned above the humidity sensor.

16. The method of claim 14, wherein the sensor housing further includes a flow compartment that is situated adjacent to the electronics accommodation compartment and in which the fluid medium is able to flow, and the flow sensor is positioned, in the separate insertion step, such that the flow sensor extends within a first plane from inside the electronics accommodation compartment into the flow compartment, and such that the pressure sensor is situated entirely below the first plane.

* * * * *